Dec. 22, 1953     L. DAUTREBANDE     2,663,382
METHOD FOR SEPARATION OF GAS-SUSPENDED DUST PARTICLES
Filed Nov. 24, 1948
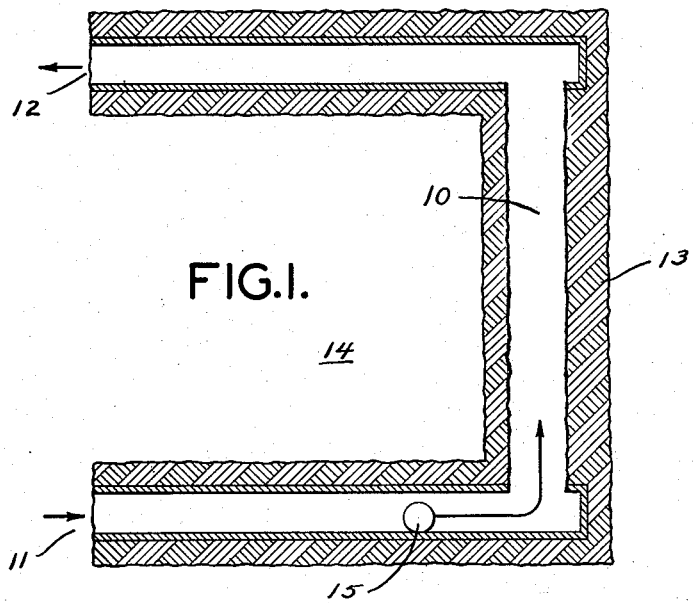
FIG.I.
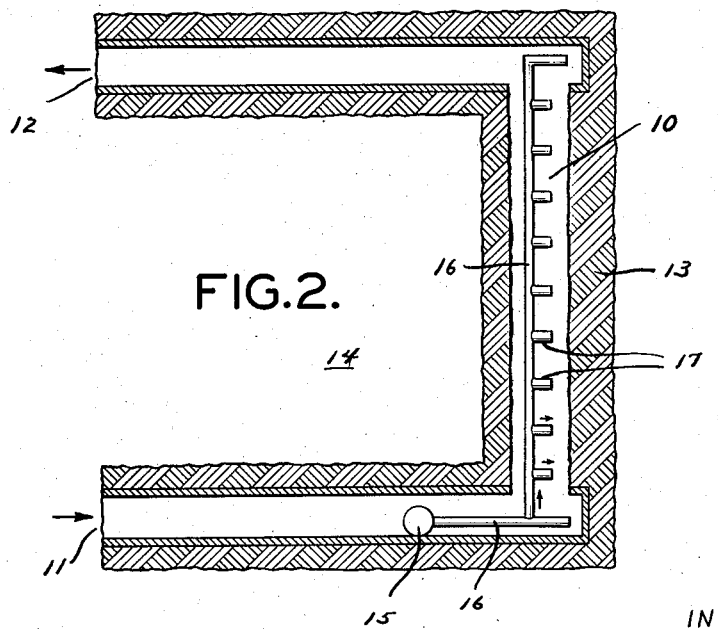
FIG.2.
INVENTOR.
LUCIEN DAUTREBANDE
BY
HIS ATTORNEYS.

Patented Dec. 22, 1953

2,663,382

UNITED STATES PATENT OFFICE 2,663,382

METHOD FOR SEPARATION OF GAS SUSPENDED DUST PARTICLES

Lucien Dautrebande, Washington, D. C., assignor to Aerosol Corporation of America, New York, N. Y., a corporation of Delaware Application November 24, 1948, Serial No. 61,862

Claims priority, application Belgium November 25, 1947

4 Claims. (Cl. 183—121)

The present invention relates to method for eliminating dust particles in suspension in contaminated zones, and especially to particles of a mean size (diameter) of not over about 0.5 micron.

The particular methods used for eliminating dusts vary in accordance with the nature of the particles to be treated, such as silica, coal, vegetable dusts, metallic dusts, and the like. However, a common characteristic is encountered when considering the retention, precipitation or elimination of particles having a diameter less than one or two microns.

It is known that certain dust particles do not have dangerous characteristics except to sensitive individuals. Particles, for example, generally exceeding five microns in size, stop in the upper respiratory passages or in the large bronchi, and as they do not penetrate in to the depths of the lungs are easily expelled, after inhalation, by vibratile bronchial cilia. Dusts smaller than two microns may penetrate into the innermost passages or regions (alveoli) in the lungs, and may, for want of means of evacuation, produce damage not only locally but even in the lymphatic system, the kidney, the liver, the spleen, etc. after absorption.

Moreover, in the case of dusts of one micron or under in size, practically the entire amount of the dust is recovered in the fine bronchioli, the alveolar tubes, and the alveolar sacs. It can be shown that these very fine dusts are not expelled through the respiratory passages by systematically examining lungs experimentally impregnated therewith and observing the condition of the alveoli during the time following the experiment. Furthermore, as it is known that the extreme division of silica dusts, for example, increases the surface of the particles with respect to their weight and in this fine condition may cause harmful action on the pulmonary tissues, it is evident that the finer the dust, the greater the danger therefrom.

Heretofore, no effective method of combatting these submicronic particles has been used. In the existing methods, particles of relatively large size have been eliminated by means of water sprays or by extraction, such as by forcing the dust to pass through a continuous liquid layer. However, it has been found that (1) a water spray fails to remove the smallest size particles and (2) particles, of two microns or less, pass without difficulty through layers of continuous and turbulent water.

It is an object of the present invention to provide new and improved method for eliminating dust particles suspended in contaminated zones, especially those particles having a mean size of a demi-micron. As a result of the elimination of such dust, a worker in the contaminated zone is not exposed to the inherent dangers previously associated therewith.

This object, as well as others is attained by the utilization of the process disclosed in the following detailed description. In accordance with the invention, liquid aerosols, more particularly aerosols of water, or water solutions of moistening agents, saline salts, and other suitable mineral or organic substances are dispersed into a dust filled zone by directing a current of aerosols into such a dust contaminated zone. If the dusts are then collected and examined under either an optical microscope, a microprojector or electronic microscope, it will be seen that the dust particles, even the finest, upon association with the current of aerosols become coated with a liquid gangue. This and supplementary agglomeration acts to increase the size of the dust particles and nullify their roughness. The condensation of the aerosol particles upon the dust particles can be enhanced by employing solutions containing a solute such as a saline salt, e. g., sodium, calcium or aluminum chloride, or other suitable mineral or organic substances. The higher the concentration of the solute, the larger and more numerous are the aggregates which are formed when the aerosol is dispersed in a contaminated zone and, therefore, it is preferred to employ strong solutions containing from 5 to 10% of a solute. Strong solutions of high valency products, i. e., salts of high valency cations, give particularly improved results in the aggregation of the dust particles over the use of mere water alone.

The size of the agglomerated masses made up of the fine dust particles may be increased to from 5 to 30 microns and these new masses, as a result of the aerosol treatment, may contain from ten to several hundred fine particles. The larger composite masses or agglomerates are also coated with a liquid film made up of the aerosols which have been brought into contact with them.

To effect such elimination, the aerosols should be stable gaseous colloids whose average particle size does not exceed 0.5 micron. The aerosols may be obtained by the apparatus described and claimed in my co-pending United States application, Serial No. 40,947, now Patent No. 2,605,088, issued July 29, 1952. The aerosols described in the above-mentioned application are spontaneously charged electrically, and may also be charged artificially to provide additional means for combatting a specific dust. The aerosols may be made of substances effective to neutralize certain irritating caustic dusts.

As the aerosols upon issuing from the generator may number several hundred thousands per cubic millimeter of air, contact is assured between the dust particles and the aerosols. Experiments have shown that under such conditions, whatever number of dust particles may be present in the atmosphere (up to 500,000 per cubic centimeter of air), no particle of dust escaped the aerosols. The number of dust particles present in the atmosphere per unit volume will determine the optimum amount of aerosols to be sprayed. Such a quantity of aerosols does not interfere with visibility in the case of aqueous solutions. Biological experiments have demonstrated that substances sprayed with aerosols are prevented from penetrating into the lungs exposed thereto, such as those working in coal mines, spinning mills and the like. It is apparent from these demonstrations that my invention may be utilized in both ceramic and cement factories, explosive plants and other mills or factories where dust problems exist. Thus, it can also be used effectively in factories where dust explosions are easily produced; i. e., flour, aluminum powder, etc.

Moreover, the presence of aerosols permits a worker to stay much longer in the dusty zone, inasmuch as the quantity of foreign particles penetrating into the lungs is decreased. Since, as previously stated, dust particles above about two microns do not penetrate into the depths of the lungs, but remain in the bronchi from where they may be expelled, it is easy to appreciate the importance of increasing the size of very fine particles.

The larger the particle of dust, the more rapid its sedimentation, and it is clear that if the size of the fine dust particles in a given dust zone can be increased, the dust content therein will be lowered. In addition, the existing control methods will be facilitated materially.

The invention may be better understood from the following detailed description, taken in conjunction with the accompanying drawings, in which: Figure 1 is a diagrammatic illustration of an apparatus suitable for carrying out the method of the invention in a mine; and, Figure 2 is an alternate embodiment of the apparatus of Figure 1.

Referring now to Figure 1, the apparatus is shown in a conventional coal mine having a working area or tunnel 10, an air inlet 11 and an air outlet 12 being provided to permit circulation of air from any suitable blower means (not shown) therethrough. Adjacent the working area 10 is the coal being mined at 13 and an area 14 serving to store the mined coal. An aerosol generator 15 is placed near the drilling tools (not shown) so that a current of air, flowing in the direction of the arrow from air inlet 11, draws the aerosol to and through the area where the dust is produced.

Figure 2 illustrates an alternate embodiment of the apparatus wherein a suitable conduit 16 is joined to the aerosol generator 15. Conduit 16 conducts the aerosol to the desired working areas through a series of branch conduits 17, which divert and distribute the aerosols over a more select operating range. Branch conduits 17 may be removed and interchanged from the conduit 16, according to the nature of the operation.

From the foregoing it is apparent that the present invention provides an effective method for eliminating suspended dust in contaminated zones, such as coal mines.

Obviously, the invention is susceptible to numerous changes in form. The aerosol generator 15 may be placed at the air inlet 11 in order to direct the aerosol-laden air onto the cut where the miners are working, and similarly for use in a factory, the aerosol generator 15 may be placed in a location such that the ventilation or convection currents which prevail therein convey the aerosol to the origin of the dust. Moreover, the chemical nature of the liquid aerosol may vary widely, for example, solutions of sodium chloride, calcium chloride, aluminum chloride, etc., may be used. Thus, the invention is not to be limited save by the appended claims.

I claim:
1. A method of eliminating dust particles having a particle size of about one micron or less in suspension in a contaminated zone which comprises directing into the contaminated zone a stable aerosol formed from a water solution having a concentration of at least 5% by weight of a material selected from a group consisting of sodium, calcium and aluminum chlorides, the aerosol having an average particle size of about 0.5 micron, sufficient at the point of generation to comprise at least several hundred thousand particles per cubic millimeter of air and sufficient to coat all the dust particles and cause agglomeration and settling thereof.

2. A method according to claim 1 in which the material is sodium chloride.

3. A method according to claim 1 in which the material is calcium chloride.

4. A method according to claim 1 in which the material is aluminum chloride.

LUCIEN DAUTREBANDE.

References Cited in the file of this patent

UNITED STATES PATENTS

| Number | Name | Date |
|---|---|---|
| 970,654 | Sepulchre | Sept. 20, 1910 |
| 2,284,317 | Greenberg | May 26, 1942 |

FOREIGN PATENTS

| Number | Country | Date |
|---|---|---|
| 102,460 | Australia | Nov. 8, 1937 |
| 336,201 | Great Britain | Oct. 6, 1930 |